United States Patent [19]
Alegi

[11] Patent Number: 5,990,475
[45] Date of Patent: Nov. 23, 1999

[54] BARRIER MOUNTABLE OPTICALLY COUPLED ISOLATOR HOUSING AND ASSEMBLY HAVING A WAVEGUIDE

[75] Inventor: Gilbert L. Alegi, Raynham, Mass.

[73] Assignee: Raytheon Company, Lexington, Mass.

[21] Appl. No.: 08/999,419

[22] Filed: Dec. 29, 1997

[51] Int. Cl.⁶ ..................................................... H01J 5/02
[52] U.S. Cl. ............................ 250/239; 250/551; 257/82
[58] Field of Search ..................................... 250/239, 551, 250/214.1, 214 R; 257/80–84, 431–435

[56] References Cited

U.S. PATENT DOCUMENTS

| | | | |
|---|---|---|---|
| 4,456,828 | 6/1984 | Mason et al. | 250/239 |
| 5,396,062 | 3/1995 | Eisentraut et al. | 250/239 |
| 5,570,204 | 10/1996 | Kumashiro | 250/239 |

FOREIGN PATENT DOCUMENTS

| | | |
|---|---|---|
| 0237237 | 9/1987 | European Pat. Off. . |
| 2611333 | 8/1988 | France . |
| 3410176 | 10/1984 | Germany . |
| 3733018 | 4/1989 | Germany . |

*Primary Examiner*—Que T. Le
*Attorney, Agent, or Firm*—Daly, Crowley & Mofford, LLP

[57] ABSTRACT

A housing for an optically coupled isolator is mountable through an aperture of an electromagnetic barrier. The housing includes a first recess in a first end for receiving an insulator and an optical driver device and a second recess in a second end for receiving an insulator and an optical detector device. A bore extends through the portion of the housing between the first and second recesses. Preferably, the bore has a length on the order of five times greater than its diameter which imparts waveguide characteristics for attenuating certain electromagnetic radiation. An outwardly extending flange of the housing has a groove in which a gasket is disposed. Preferably, the gasket is comprised of an electrically conductive material. In use, the gasket is compressed against the electromagnetic barrier and maintains electrical continuity across the barrier.

21 Claims, 6 Drawing Sheets

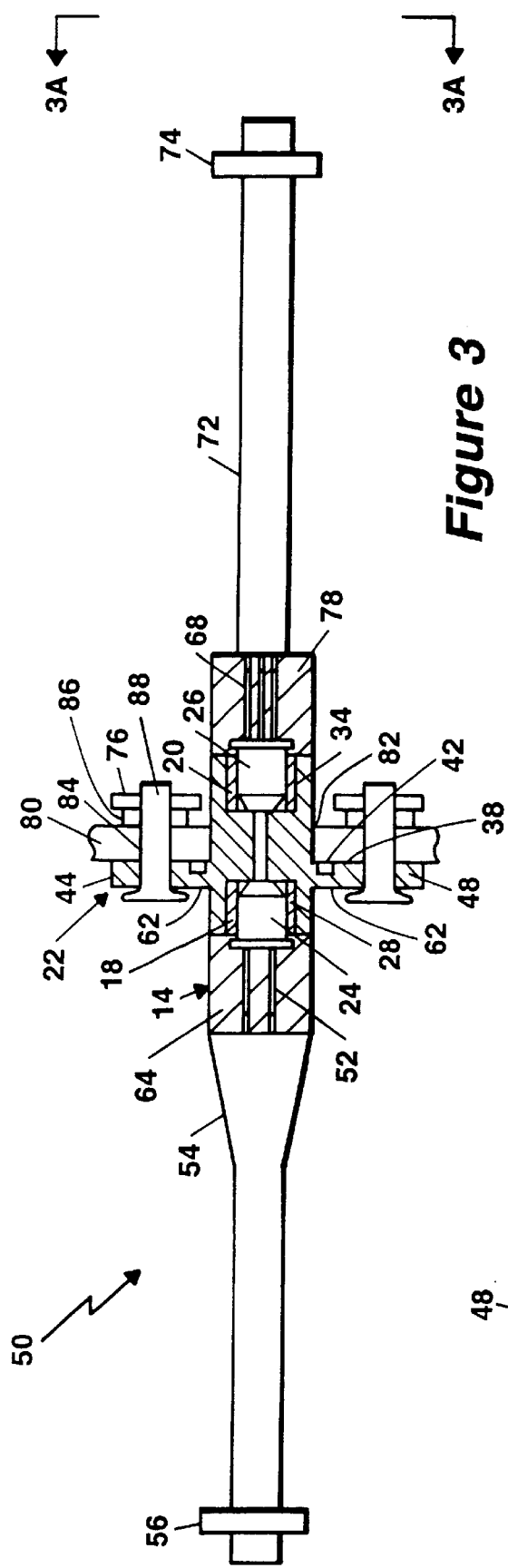
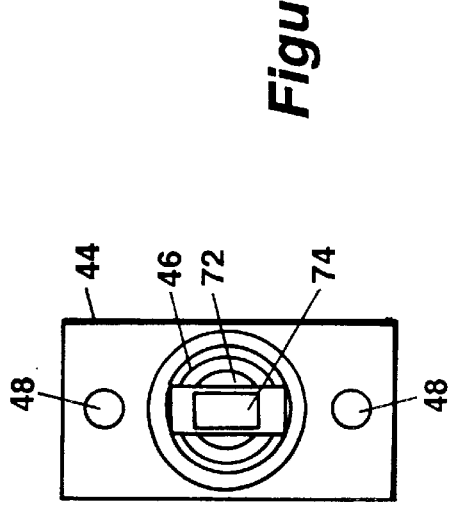
Figure 3
Figure 3A

BARRIER MOUNTABLE OPTICALLY COUPLED ISOLATOR HOUSING AND ASSEMBLY HAVING A WAVEGUIDE

STATEMENTS REGARDING FEDERALLY SPONSORED RESEARCH

This invention was made with Government support under Contract No. N00019-95-C-0124 awarded by the Department of the Navy. The Government has certain rights in this invention.

CROSS-REFERENCE TO RELATED APPLICATIONS

Not applicable.

BACKGROUND OF THE INVENTION

A typical requirement in military systems is that unencrypted, classified (RED) data be electromagnetically isolated from encrypted, unclassified (BLACK) data in order to ensure the security of the classified information. Additional stringent measures, such as TEMPEST measures, are often required to control comprising emanations. Military specifications, such as MIL-HDBK-232A RED/BLACK Engineering—Installation Guidelines (Mar. 20, 1987), provide detailed guidelines for RED/BLACK isolation and TEMPEST control.

One method of meeting stringent electromagnetic (RED/BLACK) isolation and TEMPEST control requirements is to separate classified and unclassified equipment with a barrier that functions as a Faraday shield to confine electromagnetic radiation. Preferably, the barrier is totally impervious to electromagnetic radiation. However, since data transmission between classified and unclassified equipment is often necessary, a totally impervious barrier between the two types of equipment is generally not possible.

Another technique, which provides electromagnetic isolation and still permits data transmission across a classified/unclassified (RED/BLACK) boundary, includes the use of an optically coupled isolator, or simply optical isolator. Generally, the optical driver device of the optical isolator is an infrared emitting diode and the optical detector device of the optical isolator is a photo sensor diode. Conventionally however, optically coupled isolators are housed in high dielectric housings which are suitable for mounting on a printed circuit board rather than for mounting through an electromagnetic barrier and do not incorporate techniques for meeting TEMPEST requirements.

BRIEF SUMMARY OF THE INVENTION

According to the invention, a housing for an optically coupled isolator is provided which is suitable for mounting through an aperture of an electromagnetic barrier. The housing includes a first end in which a first recess is disposed, a second end in which a second recess is disposed and a bore extending through the portion of the housing between the first and second recesses. The first recess is adapted for receiving an insulator and an optical driver device and the second recess is adapted for receiving an insulator and an optical detector device.

Preferably, the bore has a length on the order of five times greater than its diameter. With this arrangement, the bore functions as a waveguide to attenuate electromagnetic radiation. In the illustrative embodiment, this particular length-to-diameter ratio provides approximately one-hundred decibels attenuation of radiated electromagnetic fields at frequencies below cutoff. The cutoff frequency is the frequency having a wavelength equal to twice the longest cross-sectional diameter of the bore.

In one embodiment, the optical isolator housing is intended for use in an electronic assembly including a chassis having a first chamber containing classified equipment, a second chamber containing unclassified equipment and a barrier separating the first and second chambers. The housing is adapted for extending through an aperture in the barrier and includes a mounting mechanism with which the housing is mounted to the barrier.

The housing has an outwardly extending flange between the first and second ends in which a groove is disposed. The groove is adapted for receiving a gasket which, in use, is compressed against the barrier. Preferably, the gasket is comprised of an electrically conductive material which provides electrical continuity between the barrier and the housing.

With the arrangement described herein, the advantages of using a barrier to provide an electromagnetic (RED/BLACK) shield between classified and unclassified equipment are achieved, while also permitting optical isolation of data transmissions between such equipment. These advantages are achieved with the use of the optical isolator housing which supports the elements of the optical isolator, includes a waveguide structure with which electromagnetic radiation is attenuated, and is suitable for mounting to an electromagnetic barrier in a way that maintains electrical continuity across the barrier, thereby further reducing any compromising electromagnetic emanations.

In one embodiment, a first insulator is disposed in the first recess between the optical driver device and walls of the first recess and a second isolator is disposed in the second recess between the optical detector device and walls of the second recess. The insulators electrically insulate the cases of the optical driver device and the optical detector device from the housing.

Various mechanisms for mounting the housing to the barrier are suitable. In one embodiment, the mounting mechanism includes screw threads on an outer surface of the housing body adjacent to the flange and matable hardware. In assembly, the side of the flange in which the gasket is disposed abuts a first side of the barrier adjacent to the aperture and the hardware abuts a second side of the barrier adjacent to the aperture. Tightening of the hardware causes the gasket to be compressed against the barrier.

In another embodiment, the mounting mechanism includes at least one aperture on the flange and matable hardware. In assembly, the aperture on the flange is aligned with a corresponding aperture of the barrier and the hardware is passed through the aligned apertures. Tightening of the hardware urges the side of the flange in which the gasket is disposed against the barrier and causes the gasket to be compressed against the barrier.

BRIEF DESCRIPTION OF THE DRAWINGS

The foregoing features of this invention, as well as the invention itself, may be more fully understood from the following description of the drawings in which:

FIG. 3 is a partial cross-sectional view of an optical isolator assembly mounted to a barrier and including the subassembly of FIG. 2;

FIG. 3A is an end view of the assembly of FIG. 3 taken along line 3A—3A of FIG. 3;

DETAILED DESCRIPTION OF THE INVENTION

Figure 1:
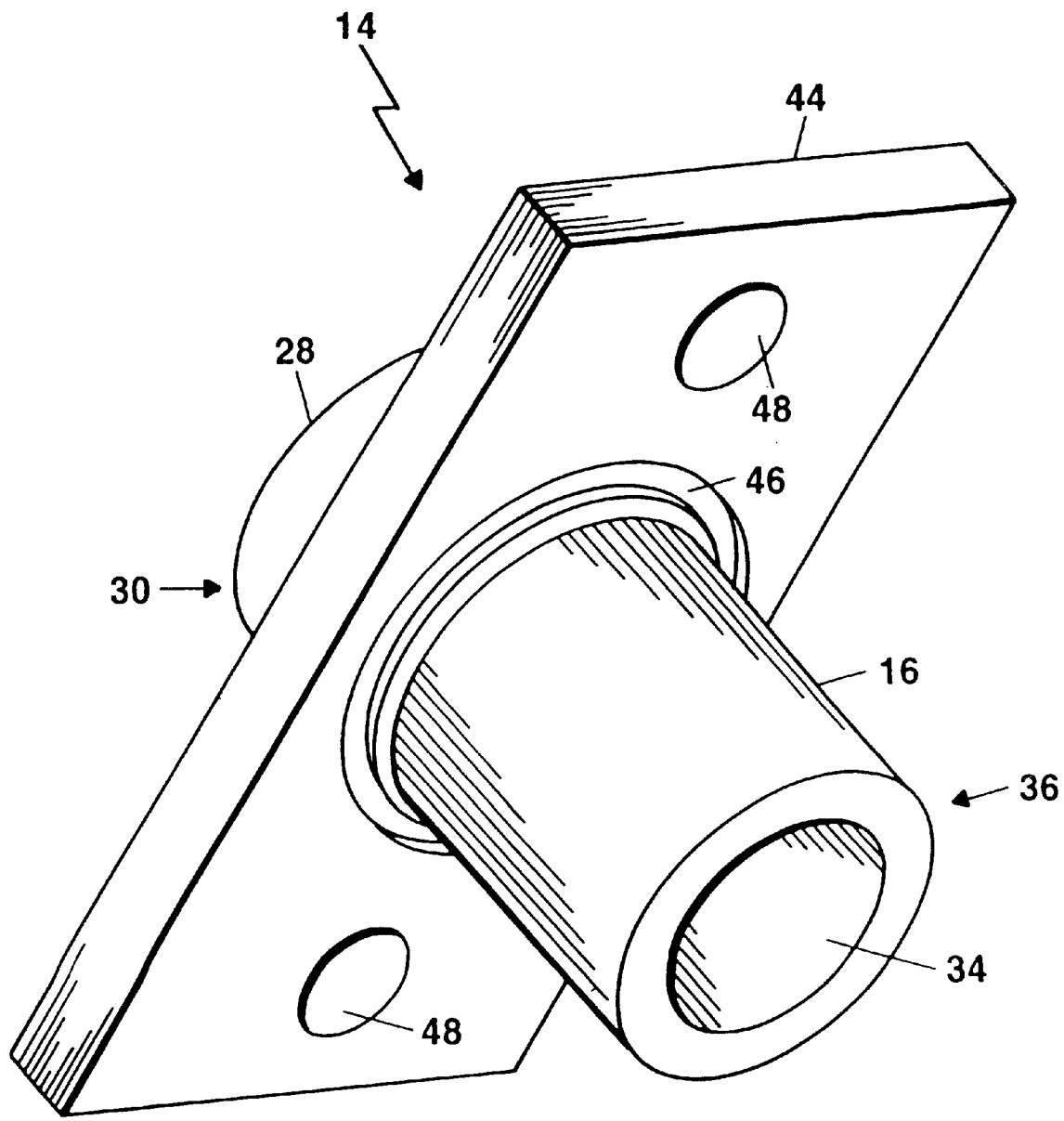
FIG. 1 is an isometric view of a barrier mountable optical isolator housing according to the invention.

Referring to FIG. 1, a housing 14 for an optically coupled isolator includes a first recess 28 in a first end 30, a second recess 34 in a second end 36, and a bore 40 (FIG. 2) extending between the first and second ends. Features of the housing 14 include a substantially cylindrical housing body 16, an outwardly extending flange 44, a groove 46 in the flange, and a mounting mechanism 48 with which the housing can be mounted to a barrier, or bulkhead, all of which are described below.

Figure 2:
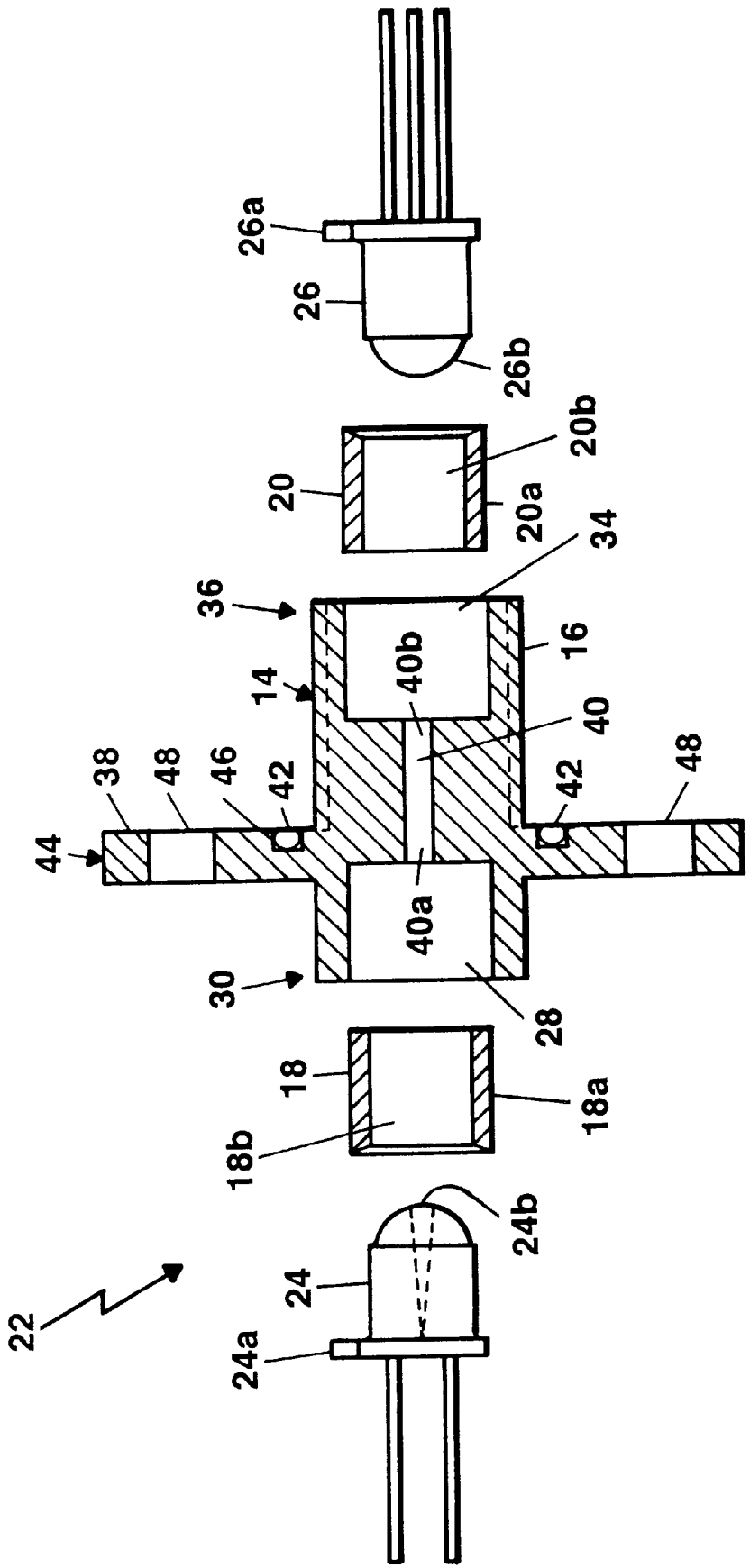
FIG. 2 is an exploded, partially cross-sectional view of an optical isolator subassembly including the housing of FIG. 1.

FIG. 2 is an exploded view of an optical isolator subassembly 22 including the housing 14 of FIG. 1. The recess 28 in the first end 30 of the housing 14 is adapted for receiving an optical driver device 24 and the recess 34 in the second end 36 of the housing is adapted for receiving an optical detector device 26. In the illustrative embodiment, each of the recesses 28, 34 has a substantially circular cross-section.

A bore 40 extends through a portion of the housing 14 between the first and second recesses 28, 34. More particularly, the bore 40 has a first end 40a at recess 28 and a second end 40b at recess 34, as shown. The bore 40 permits optical communication between the driver device 24 and the detector device 26.

Preferably, the bore 40 has a length on the order of five times greater than its diameter. This selection of the length-:diameter ratio provides certain waveguide characteristics and, in the illustrative embodiment, provides approximately one-hundred decibels attenuation of radiated electromagnetic fields at frequencies below cutoff. The cutoff frequency is the frequency having a wavelength equal to twice the longest cross-sectional diameter of the bore 40.

As will become apparent, in assembly, the optical devices 24, 26 are disposed within a respective recess 28, 34 of the housing such that the lensed end 24b, 26b of the devices 24, 26, respectively, preferably contacts, or is at least in close proximity to the respective bore end 40a, 40b. The diameter of the bore 40 is selected to accommodate substantially the entire beam angle from the optical driver device 24. In the illustrative embodiment, the optical driver device 24 has a beam angle on the order of ten degrees which, at the lensed end 24b of the device 24, corresponds to a bore diameter on the order of 0.050 inches. Once the bore diameter is determined in this manner, the bore length is selected to be on the order of 0.250 inches, or five times greater than the diameter for reasons noted above.

Figure 4:
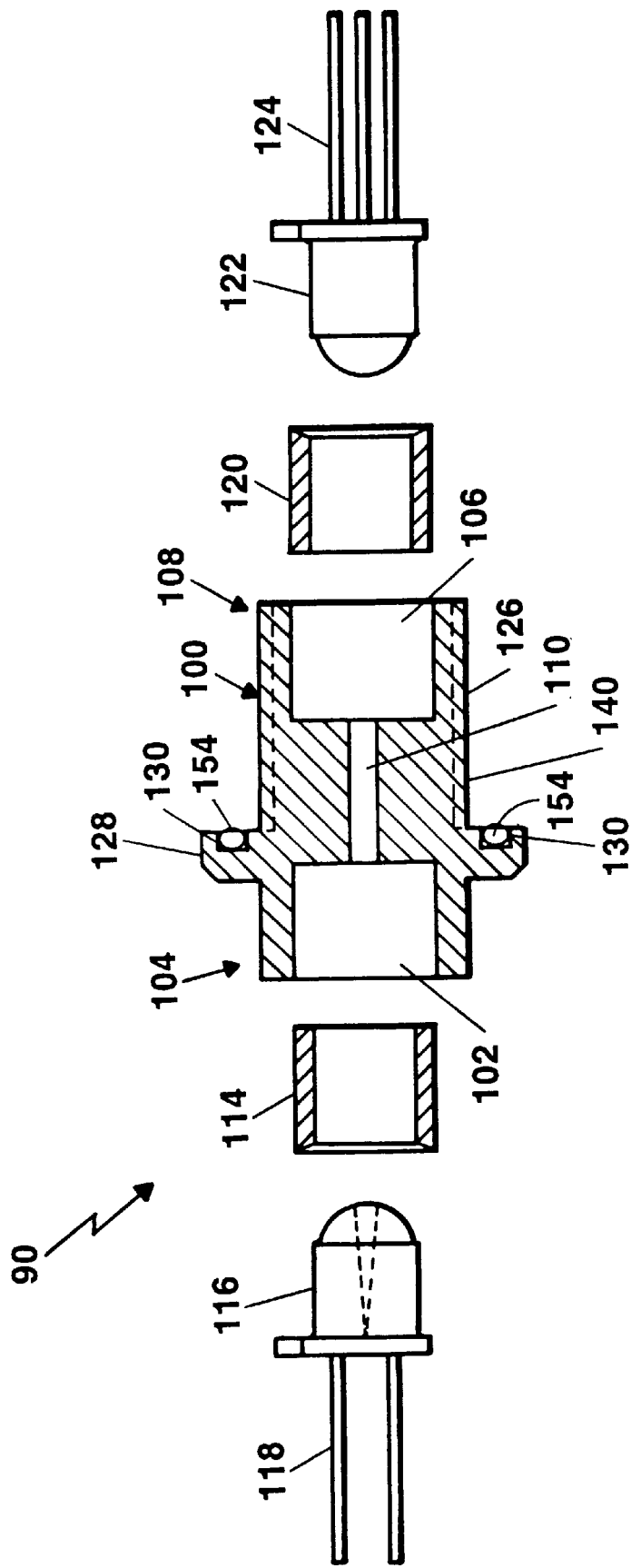
FIG. 4 is an exploded, partially cross-sectional view of an alternative optical isolator subassembly according to the invention.

The housing 14 has a flange 44 extending outwardly from an intermediate point on the housing body 16 between the first and second ends 30, 36. The flange 44 may have various shapes, such as the substantially rectangular shape of this embodiment (FIG. 1) or the substantially circular shape of a further housing embodiment described below (FIG. 4).

A groove 46 is provided in a first surface 38 of the flange 44 and extends around the housing body 16 (FIG. 1). In the illustrative embodiment, the groove 46 has a substantially circular pattern and is disposed concentrically around the housing body 16.

The groove 46 is adapted for receiving a gasket, or O-ring 42. In use, the gasket 42 compresses against a barrier to which the subassembly 22 is mounted. The sizes and shapes of the groove 46 and gasket 42 are selected to ensure that, in use, the gasket substantially fills the groove and contacts the barrier. In the illustrative embodiment, the groove 46 has a substantially rectangular cross-section and the gasket 42 has a substantially round cross-section. It will be appreciated by those of ordinary skill in the art however, that other cross-section shapes are possible.

Preferably, the gasket 42 is comprised of an electrically conductive material which maintains the electrical continuity of the barrier to which the subassembly 22 is mounted in order to provide an effective Faraday shield to electromagnetic radiation. Suitable materials for providing the gasket 42 include fluorosilicone containing electrically conductive particles, such as silver plated aluminum particles. It will be appreciated by those of ordinary skill in the art however, that other materials and combinations of materials are possible.

The mounting mechanism 48 of housing 14 includes at least one hole, or aperture in the flange 44. In the illustrative embodiment, two mounting apertures 48 are provided. In assembly, the apertures 48 are aligned with complementary apertures on the barrier 80 (FIG. 3) and mounting hardware is passed thorough the aligned holes and tightened to urge the housing 14 against the barrier and cause the gasket 42 to be compressed against the barrier.

Various materials and manufacturing techniques are suitable for providing the housing 14. In the illustrative embodiment, the housing 14 is machined from copper and has a relatively thin layer of copper plating thereover and a relatively thin layer of nickel plating over the copper plating. Copper is selected because of its good thermal and electrical conductivity characteristics. The nickel plating has good adhesion characteristics suitable for having a shielded cable soldered thereto in use, as will be described. It will be appreciated by those of ordinary skill in the art that various other materials, combinations of materials and manufacturing techniques can used to provide the housing 14.

The subassembly 22 further includes insulators 18, 20 for electrically insulating the cases of the optical devices 24, 26 from the housing 14. The insulators 18, 20 have an outer cross-section 18a, 20a sized and shaped to be complementary to the size and shape of the recesses 28, 34 and an inner channel cross-section 18b, 20b sized and shaped to accept standard packaging for the respective optical device 24, 26.

In the illustrative embodiment, the insulators 18, 20 are press fit into the respective recesses 28, 34 and thus, have an outer diameter slightly larger than the diameter of the respective recess. However, other techniques may be used to secure the insulators 18, 20 within the respective recesses 28, 34, such as the use of an adhesive as may be desirable in applications in which the subassembly 22 is expected to experience significant vibrations.

The depth of the recesses 28, 34 is selected to be slightly less than the length of the cases of the optical devices 24, 26. With this arrangement, it is ensured that even when the optical devices 24, 26 are inserted into the recesses so that the lensed ends 24b, 26b contact respective bore ends 40a, 40b, an orienting tab 24a, 26a of the device cases will not contact the respective end 30, 36 of the housing 14.

Preferably, the insulators 18, 20 have a length slightly less than the depth of the respective recess 28, 34 and, in assembly, are press fit into the recesses so as to be flush with the ends 30, 36 of the housing 14. With this arrangement, it is ensured that the optical devices 24, 26 can be inserted into the respective recess 28, 34 such that the device tips 24b, 26b contact the respective bore end 40a, 40b.

It will be appreciated by those of ordinary skill in the art that various electrically insulating materials may be used to provide the insulators 18, 20. Suitable materials for providing the insulators 18, 20 include polysulfone and polyamide, and others having good dielectric properties, a low thermal expansion rate and safe operation at temperatures over 150° C.

Various commercially available optical devices are suitable for providing the driver device 24 and the detector device 26. In the illustrative embodiment, the optical driver device 24 is an infrared emitting diode of the type sold by Optek Technology, Inc. of Carrollton, Tex. under part number OP236TX and the optical detector device 26 is a photodiode device of the type sold by Optek Technology, Inc. under part number OPL800TXV.

Referring also to FIG. 3, the subassembly 22 of FIG. 2 forms part of an optical isolator assembly 50, suitable for mounting to an electromagnetic barrier. Considering first the subassembly 22, the insulators 18, 20 are press fit into corresponding recesses 28, 34. The optical driver device 24 is inserted into the channel 18a of insulator 18 and similarly, the optical detector device 26 is inserted into the channel 20a of insulator 20. More particularly, the optical devices 24, 26 are press fit into the channels 18a, 20a of the respective insulator 18, 20 so that the device tips 24b, 26b abut bore ends 40a, 40b, respectively. To this end, the diameter of the insulator channels 18a, 20a is slightly smaller than the outer diameter of the cases of the optical devices 24, 26. It will be appreciated by those of ordinary skill in the art that other techniques for securing the optical devices relative to the insulators are possible, such as the use of an adhesive, particularly in applications in which the subassembly 22 is expected to experience significant vibrations.

In the illustrative embodiment, the gasket 42 is press fit into the groove 46. However, it will be appreciated that the gasket may be secured in the groove during mounting of the assembly 50 by other means, such as with an electrically conductive adhesive.

In use, the assembly 50 is mounted through a barrier 80 of an electronic assembly (not shown) which separates classified from unclassified equipment and permits data transmission between such equipment. The optical driver device 24 is adapted for coupling to either the classified or unclassified equipment and the optical detector device 26 is adapted for coupling to the other one of the classified and unclassified equipment. To this end, leads 52 of the optical driver device 24 are coupled to a cable 54 having a connector 56 coupled to its distal end and leads 68 of the optical detector device 26 are coupled to a cable 72 having a connector 74 coupled to its distal end.

Figure 6:
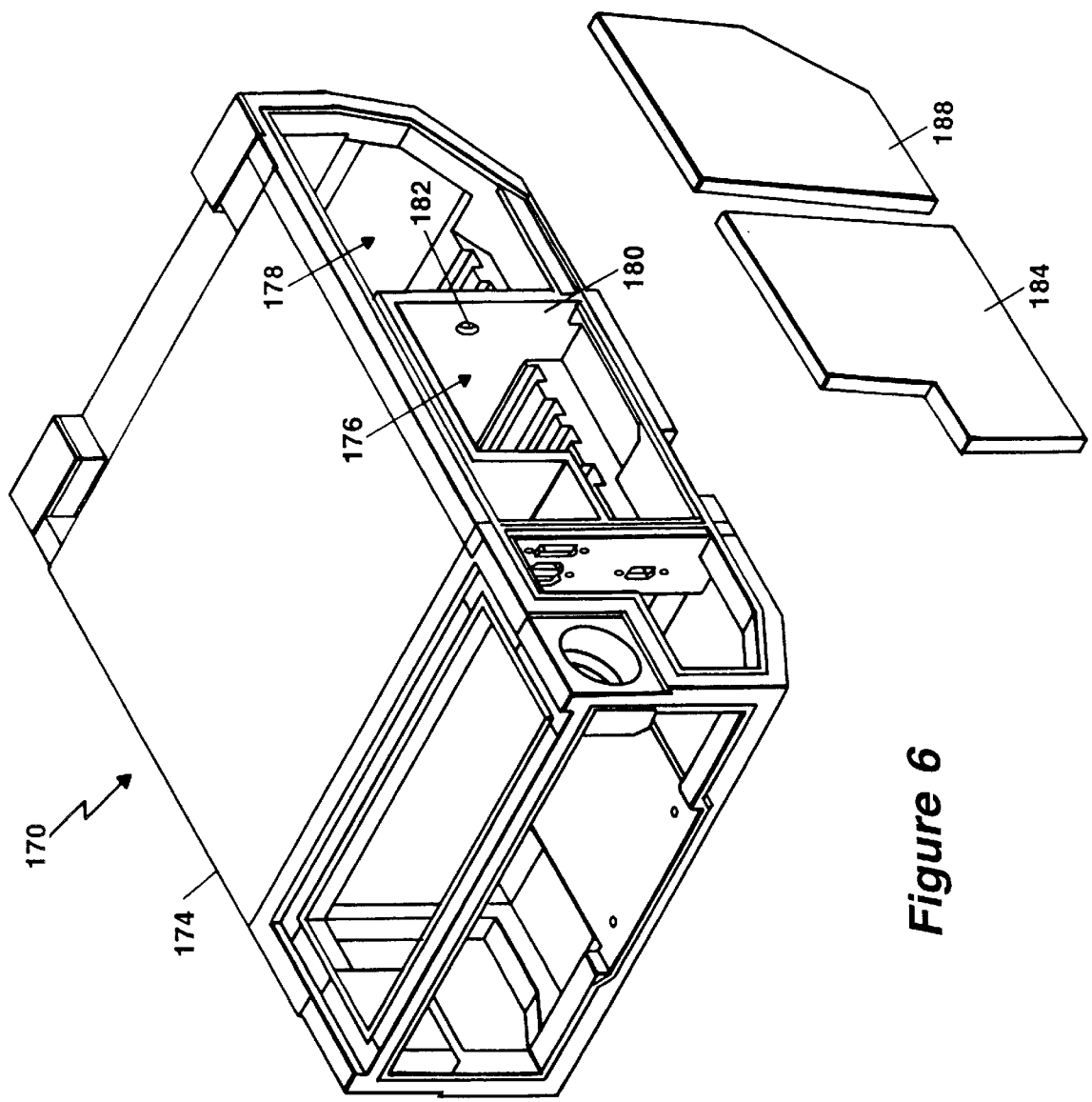
FIG. 6 is an exploded view of an electronic assembly having a barrier suitable for receiving an optical isolator assembly according to the invention.

Connectors 56, 74 are suitable for coupling to mating connectors (not shown) associated with the respective one of the classified and unclassified equipment. The cables 54, 72 and connectors 56, 74 may take various forms. In the illustrative embodiment, the cables 54, 72 include 28 AWG wires suitable for soldering to leads 52, 68 of the respective optical device 24, 26. Preferably, a potting compound 64, 78 is applied around the leads 52, 68 and connected wires as shown in order to provide mechanical strength to the solder connections. In the illustrative embodiment, cable 54 has an outer shield suitable for soldering to housing corner points 62. The connectors 56, 74 include a commercially available connector plug, such as a Dualobe® single row metal shell connector sold by Nanonics Corporation of Phoenix, Ariz.

under the Series N10138/101. It will be appreciated by those of ordinary skill in the art that other cable and connector arrangements are suitable for coupling the subassembly 22 to electronic equipment. Preferably, the connectors 56, 74 are relatively low profile connectors, since, in use, one of the connectors is passed through an aperture 182 of an electromagnetic barrier 180 (FIG. 6).

Referring also to FIG. 3A, an end view of the optical isolator assembly 50 is shown. Features of the assembly 50 shown in FIG. 3A include the substantially rectangular flange 44 including mounting apertures 48 and groove 46. Also shown in FIG. 3A are the cable 72 and connector 74.

In use, the assembly 50 of FIG. 3 is passed through an aperture 82 of an electromagnetic barrier 80 and the mounting apertures 48 on the flange 44 are brought into alignment with complementary apertures 84 of the barrier. Mounting hardware is then passed through the aligned apertures and tightened to urge the surface 38 of the flange 44 against the barrier 80 and compress the gasket 42 against the barrier. In the illustrative embodiment, the hardware includes a flat washer 76, a lock washer 86 and a screw 88.

Referring to FIG. 4, an alternate optical isolator subassembly 90 includes a housing 100, insulators 114, 120, which are substantially identical to insulators 18, 20 (FIG. 2), and optical devices 116, 122, which are substantially identical to optical devices 24, 26 (FIG. 2). The housing 100 differs from housing 14 (FIG. 2) in the mounting mechanism by which the housing is mounted to a barrier, as will be described.

Like the housing 14 (FIG. 2), housing 100 has a first recess 102 disposed in a first end 104, a second recess 106 disposed in a second end 108, and a substantially cylindrical body 126 extending between the first and second ends. Further, the housing 100 has a bore 110 extending through a portion thereof between the first and second recesses 102, 106. Like the bore 40 (FIG. 2), bore 110 preferably has a length on the order of five times greater than its diameter in order to provide waveguide characteristics as discussed above.

The housing 100 is adapted for receiving, in the first recess 102, the first insulator 114 and the optical driver device 116. Similarly, the housing 100 is adapted for receiving, in the second recess 106, the second insulator 120 and the optical detector device 122, as described above in conjunction with the embodiment of FIGS. 1–3. Like the subassembly 22 (FIG. 2), subassembly 90 is suitable for coupling to classified and unclassified equipment via cables and connectors like those shown in FIG. 3 soldered to leads 118, 124 of the optical devices 116, 122, respectively.

Housing 100 has an outwardly extending flange 128 with a groove 130 disposed therein and adapted for receiving a gasket 154, like gasket 42 (FIG. 2), in use. However, the housing 100 differs from the housing 14 in that the flange 128 of housing 100 extends outwardly from the housing body 126 to a lesser extent because the mounting mechanism is not disposed on the flange 128. Further, whereas flange 44 has a substantially rectangular shape, flange 128 has a substantially circular shape.

The mechanism for mounting the housing 100 to a barrier includes a plurality of screw threads 140 extending around at least a portion of the housing body 126. Preferably, the screw threads 140 are sized and shaped in order to be compatible with standard fiber optic hardware meeting military specifications.

Figure 5:
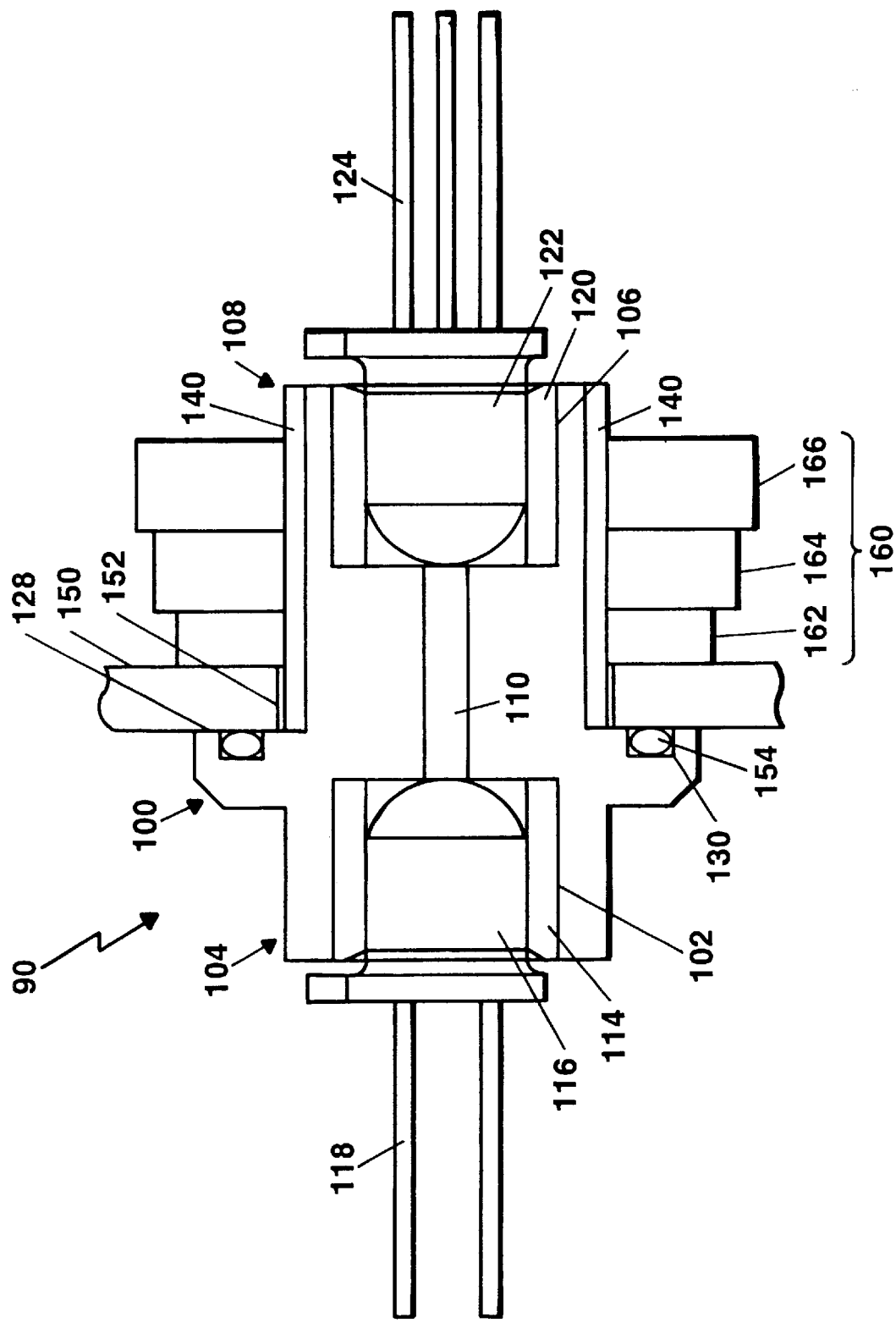
FIG. 5 is a partial cross-sectional view of the subassembly of FIG. 4 mounted to a barrier.

Referring also to FIG. 5, the subassembly 90 is shown mounted to a barrier 150, and without cable and connectors coupled to the leads 118, 124 of the optical devices 116, 122 for simplicity of illustration. The elements of the subassembly 90 are assembled in the manner described above in conjunction with the embodiment of FIGS. 1–3.

In use, the subassembly 90 is passed through an aperture 152 of a barrier 150, until the side of the flange 128 in which the groove 130 is disposed contacts a portion of the barrier 150 adjacent to the aperture 152. Thereafter, mounting hardware 160 is fed over the connector and cable (not shown) and the end 108 of the housing 100 to mate with the screw threads 140. In the illustrative embodiment, the mounting hardware 160 includes a tooth lock washer 162, a flat washer 164 and a nut 166. Tightening of the hardware 160 causes the flange 128 to be urged against the barrier 150 and the gasket 154 to be compressed against the barrier 150. It will be appreciated by those of ordinary skill in the art that various other mounting hardware and, in fact, various other mounting schemes in addition to those described and shown herein are possible.

Referring to FIG. 6, an illustrative electronic assembly 170 of the type suitable for using the optical isolator subassemblies 22 (FIG. 2) and 90 (FIG. 4) is shown. The electronic assembly 170 may contain various types of electronic circuitry. In one application, the electronic assembly 170 houses military training electronics.

The electronic assembly 170 includes a chassis 174 having a first chamber 176 and a second chamber 178. More particularly, the first chamber 176 is adapted for housing either unclassified, encrypted equipment or classified, unencrypted equipment and the second chamber 178 contains the other of classified or unclassified equipment.

The chassis 174 further includes a barrier 180 separating the first and second chambers 176, 178. The barrier 180 functions as a Faraday shield to confine electromagnetic radiation. In the illustrative embodiment, the barrier 180 is comprised of aluminum.

An aperture 182 extends through the barrier 180 and is sized to receive an optically coupled isolator assembly of the type described above. The diameter of the aperture 182 is selected to accommodate the body of the housing 14 (FIG. 2), 100 (FIG. 4) and the cable and connector coupled to the optical devices. In the illustrative embodiment, the aperture 182 has a diameter in the range of about 0.382–0.443 inches, depending on the mechanism for mounting the housing 14, 100 to the barrier 180.

Each of the chambers 176, 178 has a backplane 184, 188, respectively, adapted for enclosing an exposed end thereof. Further, each of the backplanes 184, 188 has electrical connectors mounted thereto (not shown) and adapted to mate with connectors of the optical isolator assembly (labelled 56, 74 in FIG. 3) and contains conductive traces for electrically connecting the optical devices to other equipment in the respective chamber 176, 178.

It will be appreciated by those of ordinary skill in the art that various forms of electronic assemblies in which it is desired to prevent electromagnetic radiation from passing between chambers separated by a barrier can benefit from the present invention. In particular, the housings 14, 100 and the associated subassemblies 22, 90, respectively, described herein advantageously permit mounting of an optically coupled isolator through an aperture in an electromagnetic barrier in a manner which significantly attenuates electromagnetic radiation. In particular, electromagnetic radiation is attenuated by the waveguide bore extending through the housing and by the electrically conductive gasket which maintains electrical continuity across the barrier.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An optically coupled isolator housing comprising:
   a first end in which a first recess is disposed;
   a second end in which a second recess is disposed;
   a bore extending from said first recess to said second recess, wherein said bore has a length and a diameter having a predetermined ratio selected to provide a predetermined signal attenuation; and
   a mounting mechanism suitable for mounting said housing to a barrier so that said first recess is positioned on a first side of said barrier and said second recess is positioned on a second side of said barrier.

2. The housing of claim 1 wherein said first recess is adapted for receiving an optical driver device and said second recess is adapted for receiving an optical detector device.

3. The housing of claim 2 wherein said first recess is further adapted for receiving a first insulator between walls of said first recess and said optical driver device and said second recess is further adapted for receiving a second insulator between walls of said second recess and said optical detector device.

4. The housing of claim 1 further comprising:
   an outwardly extending flange disposed between said first and second ends, said flange having a groove therein; and
   a gasket, disposed in said groove and adapted for being compressed against a barrier in use.

5. The housing of claim 1 wherein said mounting mechanism comprises screw threads on an outer surface of said housing, said screw threads adapted for receiving at least one piece of hardware with which said housing is urged against said barrier.

6. The housing of claim 1 wherein said mounting mechanism comprises an outwardly extending flange and at least one aperture disposed through the flange and adapted for receiving at least one piece of hardware with which said housing is urged against said barrier.

7. The housing of claim 1 wherein said length of said bore is on the order of five times greater than said diameter of said bore.

8. The housing of claim 4 wherein said housing is comprised of an electrically conductive material.

9. The housing of claim 8 wherein said gasket is comprised of an electrically conductive material.

10. An optically coupled isolator subassembly, comprising:
    a housing having a first recess in a first end and a second recess in a second end, a bore extending from said first recess to said second recess and an outwardly extending flange disposed between said first and second ends of said housing, said flange having a groove therein, wherein said bore has a length and a diameter having a predetermined ratio selected to provide a predetermined signal attenuation and wherein said housing is mounted to a barrier so that said first recess is positioned on a first side of said barrier and said second recess is positioned on a second side of said barrier;

a gasket disposed in said groove of said flange;

a first insulator disposed in said first recess, said first insulator sized and shaped to receive an optical driver device; and a second insulator disposed in said second recess, said second insulator sized and shaped to receive an optical detector device.

11. The subassembly of claim 10 wherein said flange has at least one aperture adapted for receiving at least one piece of hardware with which said housing is urged against said barrier.

12. The subassembly of claim 10 wherein said length of said bore is on the order of five times greater than said diameter of said bore.

13. The subassembly of claim 10 wherein said gasket is comprised of an electrically conductive material.

14. The subassembly of claim 10 wherein each of said first and second insulators is comprised of an electrically isolating material.

15. The subassembly of claim 10 wherein said housing has screw threads on an outer surface, said screw threads adapted for receiving at least one piece of hardware with which said housing is urged against said barrier.

16. An electronic assembly comprising:

a chassis having a first chamber and a second chamber;

a barrier separating said first chamber from said second chamber and having an aperture therethrough; and an optically coupled isolator subassembly disposed through said aperture in said barrier, said subassembly comprising:

a housing having a first recess in a first end and a second recess in a second end, a bore extending from said first recess to said second recess and an outwardly extending flange disposed between said first and second ends of said housing, said flange having a groove therein, wherein said bore has a length and a diameter having a predetermined ratio selected to provide a predetermined signal attenuation and wherein said housing is disposed through said aperture in said barrier so that said first recess is positioned in said first chamber and said second recess is positioned in said second chamber; and a gasket disposed in said groove of said flange and adapted for being compressed against said barrier in use.

17. The electronic assembly of claim 16 wherein said length of said bore is on the order of five times greater than said diameter of said bore.

18. The electronic assembly of claim 17 further comprising a first insulator disposed in said first recess between walls of said first recess and said optical driver device and a second insulator disposed in said second recess between walls of said second recess and said optical detector device.

19. The electronic assembly of claim 16 further comprising an optical driver device disposed in said first recess of said housing and an optical detector device disposed in said second recess of said housing.

20. The electronic assembly of claim 19 further comprising:

a first backplane coupled to said chassis in said first chamber;

a first connector mounted on said backplane and adapted for coupling to said optical driver device;

a second backplane coupled to said chassis in said second chamber; and a second connector mounted on said backplane and adapted for coupling to said optical detector device.

21. The electronic assembly of claim 16 wherein said gasket is comprised of an electrically conductive material.

* * * * *